(12) United States Patent
Li et al.

(10) Patent No.: US 10,986,543 B2
(45) Date of Patent: Apr. 20, 2021

(54) METHOD AND DEVICE FOR DETERMINING A BEARER IDENTIFIER, AND STORAGE MEDIUM THEREFOR

(71) Applicant: ZTE Corporation, Guangdong (CN)

(72) Inventors: Zhendong Li, Guangdong (CN); Jinguo Zhu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/556,210

(22) Filed: Aug. 29, 2019

(65) Prior Publication Data

US 2019/0394684 A1    Dec. 26, 2019

Related U.S. Application Data

(63) Continuation of application No. PCT/CN2018/099997, filed on Aug. 10, 2018.

(30) Foreign Application Priority Data

Nov. 21, 2017   (CN) .......................... 201711178240.0

(51) Int. Cl.
*H04W 36/00* (2009.01)
*H04W 36/14* (2009.01)
*H04W 36/02* (2009.01)
*H04W 60/00* (2009.01)

(52) U.S. Cl.
CPC ....... *H04W 36/0022* (2013.01); *H04W 36/00* (2013.01); *H04W 36/0016* (2013.01);
(Continued)

(58) Field of Classification Search
CPC ......... H04W 36/0022; H04W 36/0016; H04W 36/14; H04W 36/00; H04W 36/02; H04W 60/00; H04W 36/0033
(Continued)

(56) References Cited

U.S. PATENT DOCUMENTS

2015/0065132 A1    3/2015  Ramkumar et al.
2018/0376384 A1*  12/2018  Youn ........................ H04W 8/02

FOREIGN PATENT DOCUMENTS

CN       107018542 A     8/2017
WO    2016/122589 A1     8/2016
(Continued)

OTHER PUBLICATIONS

International Search Report and Written Opinion dated Nov. 12, 2018 for International Application No. PCT/CN2018/099997, filed on Date (11 pages).
(Continued)

*Primary Examiner* — Michael Y Mapa
(74) *Attorney, Agent, or Firm* — Perkins Coie LLP

(57) ABSTRACT

Provided are a method and device for determining a bearer identifier (ID), and a storage medium. The above-mentioned method for determining the bearer ID includes that: a target access and mobility control function (tAMF) transmits a session update request to a session management function (SMF), and receives a session update response that carries bearer ID allocation information and that is fed back by the SMF. The above-mentioned technical solution may solve a problem in the related art, yet to be solved effectively, of how to determine allocated evolved packet system (EPS) bearer ID (EBI) information after mobility events such as idle state mobility within 5G, idle state mobility from 4G to 5G and a connected state handover from 4G to 5G occur.

24 Claims, 7 Drawing Sheets

(52) U.S. Cl.
CPC ....... *H04W 36/0033* (2013.01); *H04W 36/02* (2013.01); *H04W 36/14* (2013.01); *H04W 60/00* (2013.01)

(58) Field of Classification Search
USPC ....... 455/435.1–445, 450–453; 370/331, 252
See application file for complete search history.

(56) References Cited

FOREIGN PATENT DOCUMENTS

| | | |
|---|---|---|
| WO | 2016/195735 A1 | 12/2016 |
| WO | WO-2019077011 A1 * | 4/2019 ........ H04W 36/0066 |

OTHER PUBLICATIONS

ZTE Corporation, "23.502 P-CR Discussion and proposal on EBI management, exhaustion and relocation," 3GPP SA WG2 Meeting #123, S2-177112, Ljubljana, Slovenia, 9 pages, Oct. 2017.

ZTE Corporation, "TS 23.502 pCR on the EBI transfer after Idle or connected mode mobility," 3GPP SA WG2 Meeting #124, S2-178750, Reno, Nevada, USA, 5 pages, Dec. 2017.

ZTE Corporation, "TS 23.502 pCR on the EBI transfer after Idle or connected mode mobility," 3GPP SA WG2 Meeting #124, S2-178964, Reno, Nevada, USA, 5 pages, Dec. 2017.

Ericsson, "Handling of Ethernet and unstructured PDU session types when interworking with EPC (23.502)," SA WG2 Meeting #123, Ljubljana, Slovenia, S2-177939, 9 pages, Oct. 2017.

Extended Search Report dated May 15, 2020 for European Application No. 18880243.3, filed on Aug. 10, 2018 (14 pages).

Huawei, "Update of 4G to 5G interworking handover with Nx interface", SA WG2 Meeting #122, San Jose del Cabo, Mexico, S2-175158, 9 pages, Jun. 2017.

Huawei, et al., "EBI assignment for HR roaming case," 3GPP TSG-SA WG2 Meeting #127bis, Newport Beach, California, USA, S2-185112, 6 pages, Jun. 2018.

NTT DOCOMO, "Clarifications to idle mode mobility with N26," SA WG2 Meeting #124, Reno, Nevada, USA, S2-17xxxx, 4 pages, Dec. 2017.

* cited by examiner

METHOD AND DEVICE FOR DETERMINING A BEARER IDENTIFIER, AND STORAGE MEDIUM THEREFOR

CROSS REFERENCE TO RELATED APPLICATIONS

This patent document is a continuation of and claims the benefit of priority to International Patent Application No. PCT/CN2018/099997, filed on Aug. 10, 2018, which claims the benefit of priority to Chinese Patent Application No. 201711178240.0, filed on Nov. 21, 2017. The entire contents of the before-mentioned patent applications are incorporated by reference as part of the disclosure of this application.

TECHNICAL FIELD

The present disclosure refers to the field of Next Generation wireless communications (5G), and specifically, to a method and a device for determining an Evolved Packet System (EPS) bearer identifier (ID), and a storage medium.

BACKGROUND

The 3rd Generation Partnership Project (3GPP) began to develop a fourth-generation (or Long Term Evolution (LTE)) mobile communication system from Release 8 (R8). FIG. 1 is a network architecture diagram of the fourth-generation mobile communication system in a related art, and functions of the various network elements are described below.

A user equipment (UE) is accessed to the 4G network and obtains services mainly via a wireless air interface. The UE interacts with a base station via the air interface, and interacts with a mobility management entity (MME) of a core network via non-access-stratum (NAS) signaling.

A radio access network (RAN) base station (eNB) is responsible for air interface resource scheduling and air interface connection management of a network to which the UE is accessed to.

The MME is a core network control plane entity, and is mainly responsible for user authentication, authorization and subscription checking, user mobility management, packet data network (PDN) connection, bearer maintenance, paging triggering in a user IDLE state, and other functions.

A serving gateway (S-GW) is a core network user plane function entity, and is mainly responsible for an interaction with a PDN gateway (GW) in the case of roaming.

The PDN GW (P-GW) is a core network user plane function entity and an access point which is used for the UE to access the PDN, is responsible for user Internet Protocol (IP) address allocation, network-triggered bearer establishment, modification and deletion, Quality of Service (QoS) control, charging and other functions, and is the anchor point of the user in the 3GPP system, and thus the IP address is ensured to be unchanged and service continuity is ensured. In a control and forwarding separation architecture, the P-GW is further divided into two parts. One is a packet data network gateway control entity (PGW-Control, PGW-C), and another is a packet data network gateway user plane entity (PGW-User, PGW-U). The PGW-C is responsible for signaling control and the PGW-U is responsible for IP data forwarding.

A home subscription server (HSS) stores subscription information of the user.

A policy and charging control function (PCRF) is responsible for formulating policy decisions and charging rules. The PCRF provides network control rules based on service data flows. The network control includes service data flow detection, gating control, QoS control, a charging rule based on data flows, and the like. The PCRF transmits the policies and charging rules formulated by the PCRF itself to the P-GW for execution.

The 3GPP began researching the NextGen System (5GS) from Release 14 (R14). The NextGen System may support three types of services: evolved mobile broadband (eMBB), massive machine type communication (mMTC), and ultra reliable machine type communication (uMTC), which have different network characteristics. FIG. 2 is a schematic diagram of a NextGen mobile communication network architecture in the related art, the functions of the various network elements are described below.

The UE is accessed to the network and obtains services mainly via a NextGen wireless air interface. The UE interacts with a base station via the air interface, and interacts with a common control plane function and a session control plane function of the core network via the NAS signaling.

A NextGen radio access network (NG RAN) base station is responsible for the air interface resource scheduling and air interface connection management of the network to which the UE is accessed to. The NG RAN base station may adopt a new radio (NR) access technology (gNB) or an evolved LTE technology (eLTE).

A session management function (SMF) interacts with the UE, and is mainly responsible for processing requests of user packet data unit (PDU) session (PDU session) establishment, modification and deletion, selecting user plane functions (UPF), establishing a user plane connection between the UE and the UPF, determining session QoS parameters together with a policy control function (PCF), and the like. Each PDU session of the UE has a corresponding SMF, and different PDU sessions may have different SMFs.

An access and mobility control function (AMF) is a common control plane function in the core network. A user has only one AMF. The one AMF is responsible for user authentication, authorization, and subscription checking to ensure that a user is a legitimate user and for user mobility management, including location registration and temporary identifier allocation. The one AMF is also responsible for selecting an appropriate SMF when the user initiates a PDU connection establishment request, forwarding the NAS signaling between the UE and the SMF, and forwarding access stratum (AS) signaling between the base station and the SMF.

The UPF provides user plane processing functions, including data forwarding and QoS execution. When users move, the UPF also provides user plane anchor points to ensure service continuity.

The PCF provides the authorization function of resources, which is similar to the PCRF in the 4G network.

A unified data management (UDM) stores subscription data of the user, which is similar to the HSS of the 4G era.

The NextGen System (5GS) will begin to be deployed locally in hotspots such as downtown and commercial centers. If the UE is accessed to the 5G system, as the user moves outside of the coverage of the 5G system, the UE of the user is handed over to the 4G system.

FIG. 3 is a network architecture diagram of a bidirectional handover between 4G and 5G in the related art. A core feature is that the architecture is compatible with 4G and 5G architectures at the same time. Another core feature is a combination of the PGW-C and the SMF, a combination of the PGW-U and the UPF, and a combination of the PCF and the PCRF, and the user plane of the UE is always anchored on the UPF/PGW-U. An N26 interface is added between the AMF and the MME, and an inter-system handover request is transmitted at the N26 interface. In this way, when the UE is handed over between LTE and 5G, a seamless handover can be ensured.

In the 4G system, each PDN connection established between the UE and the network includes one default bearer and multiple dedicated bearers. Information of each bearer includes corresponding service flows and QoS parameters, and each bearer has a corresponding evolved packet system (EPS) bearer ID (EBI). In the 4G system, the EBI is allocated by the MME. The EBI is unique among all PDN Connections of the UE. EBI has 4 bits, and theoretically 16 values are provided. Some of the 16 values are reserved, and then at most 11 values are available.

In the 5G system, a PDU session is established between the UE and the network, and one default QoS flow and multiple dedicated QoS flows are included. Each QoS flow includes corresponding service flows and QoS parameters, such as a QoS profile and a packet filter. Each QoS flow also has a corresponding identifier: QoS flow ID (QFI). Within each PDU session, the QFI is unique.

Seamless mobility of the UE between the 4G system and the 5G system includes a handover from 4G to 5G and idle state mobility from 4G to 5G, where an IP address of the UE is unchanged.

When the UE moves from the 5G system to the 4G system, a PDU session established in the 5G system is converted to a PDN connection in the 4G system. And the QoS flow in the PDU session is converted to a bearer in the 4G system. Alternatively, when the UE moves from the 4G system to the 5G system, the PDN connection established in the 4G system is converted to the PDU session established in the 5G system, and the bearer in the PDN connection is converted to the QoS flow in the 5G system.

In order to ensure the above-mentioned seamless mobility, when a QoS flow of the PDU session is established for the UE in the 5G system, the SMF/PGW-C needs to allocate 4G session parameters/bearer information corresponding to the QoS flow, and transmit the session parameters/bearing information to the UE. When a PDN connection and a bearer are established in the 4G system, the PGW-C/SMF also needs to allocate a 5G PDU session and QoS flow information corresponding to the PDN connection and the bearer, and transmits the 5G PDU session and the QoS flow information to the UE.

Since multiple SMFs may be provided for a UE, EBI allocation by the SMFs results in an EBI collision, that is, a same EBI value is allocated by two SMFs. In the existing art, if a PDU session is established for the UE in the 5G system, and when the 4G session parameter is allocated for the QoS flow, the EBI allocation is performed by the AMF, and the remaining parameters are allocated by the SMF.

However, when the UE moves, how does a target AMF know which EBIs have been allocated? The scenarios included are described below.

Scenario 1: For inter-AMF idle state mobility, if the UE transmits a registration request to the target AMF, how does the target AMF know which EBIs have been allocated by a source AMF.

Scenario 2: For an inter-AMF handover, if the UE needs to be handed over to the target AMF, how does the target AMF know which EBIs have been assigned by the source AMF.

Scenario 3: For idle state mobility from 4G to 5G, if the UE transmits a registration request to the target AMF in the 5G system, how does the AMF know which EBIs have been allocated by the MME in the 4G system.

Scenario 4: For a connected state handover from 4G to 5G, after the UE is handed over to 5G, how does the target AMF know which EBIs have been allocated by the source MME.

When the 5G network and the traditional 4G network or the LTE base station coexist, in order to achieve the determination of the bearer ID between the 4G network system and the 5G network system, and within the 5G network system, the EBI allocation situation is used as the mobility context of the AMF to be passed from the source AMF to the target AMF in the existing art. However, this solution can deal with only the scenarios 1 and 2, not the scenarios 3 and 4. If the MME is modified and enabled to pass the EBI allocation information, the modification of the MME is very complicated. In addition, the EBI allocation information includes not only a list of EBI values, but also 5G session information corresponding to each EBI value. However, in 4G, all of the 5G session information is allocated by the PGW-C/SMF, and not available for the MME.

In the existing art, after mobility events such as idle state mobility within 5G, idle state mobility from 4G to 5G and a connected state handover from 4G to 5G occur, how to determine allocated EBI information remains to be effectively solved.

SUMMARY

Embodiments of the present disclosure provide a method and device for determining a bearer identifier (ID), and a storage medium, to at least solve the problem in the related art, yet to be solved effectively, of how to determine allocated evolved packet system (EPS) bearer ID (EBI) information after mobility events such as idle state mobility within 5G, idle state mobility from 4G to 5G and a connected state handover from 4G to 5G occur.

An embodiment of the present disclosure provides a method for determining a bearer ID, including:

transmitting a session update request to a session management function (SMF) by a target access and mobility control function (tAMF), and receiving, by the tAMF, a session update response that carries bearer ID allocation information and that is responded by the SMF.

Optionally, the bearer ID allocation information is used for notifying the tAMF of: bearer IDs allocated by a source access and mobility control function (sAMF) or a mobile management entity (MME).

Optionally, the session update request carries an indication for requesting bearer ID information.

Optionally, the bearer ID allocation information includes a bearer ID list, or includes the bearer ID list and at least one of: a priority corresponding to each bearer ID, and a packet data unit session (PDU session) ID.

Optionally, the transmitting, by the tAMF, the session update request to the SMF includes:

receiving a registration request transmitted from a user equipment (UE) by the tAMF;

requesting a context of the UE from a first network element of a source network by the tAMF after the tAMF receives the registration request; and receiving the context of the UE transmitted by the first network element of the source network by the tAMF, and transmitting the session update request to the SMF according to the context by the tAMF.

Optionally, the registration request includes: a registration request that is transmitted by the UE that has accessed to a 5G network and entered into an idle state or a registration request that is transmitted by the UE that has accessed to a 4G network and entered into an idle state and then the UE moves to the 5G network.

Optionally, the method further includes:

initiating a location updating process to a unified data management (UDM) by the tAMF, where the location updating process is used for the UDM to initiate a location deleting process to the source AMF.

Optionally, before the transmitting the session update request to the SMF by the tAMF, the method further includes:

receiving a handover preparation response message transmitted by a target base station by the tAMF.

Optionally, the method further includes:

Receiving, by the tAMF, a handover preparation request that is transmitted by a first network element of a source network after the first network element of the source network receives a handover request transmitted from a source base station, where the handover preparation request carries target base station information and current session information;

transmitting a packet data unit session (PDU session) handover request to the SMF by the tAMF according to the handover preparation request;

receiving, by the tAMF, N2 session information of the PDU session to be handed over transmitted from the SMF; and transmitting a handover preparation request to the target base station by the tAMF according to the session information of the PDU session to be handed over, where the handover preparation request is used for requesting a resource reservation;

where the handover preparation response message carries reserved radio resource information, N2 response information, and N3 tunnel information that is allocated to a PDU session in which a resource is successfully reserved; and the session update request carries the handover preparation response message.

Optionally, the method further includes: returning a handover response to a first network element of a source network by the tAMF, where the handover response is used for the first network element of the source network to transmit a handover command to a source base station and the handover command is used for a user equipment (UE) to hand over from the source base station to the target base station.

Optionally, before the transmitting the session update request to the SMF by the tAMF, the method further includes: receiving a handover complete notification transmitted from a target base station by the tAMF.

Optionally, the first network element of the source network includes: a source access and mobility control function (sAMF) or a mobile management entity (MME).

Optionally, the SMF includes: the SMF itself or a combination of the SMF and a packet data network (PDN) gateway control plane (PGW-C).

An embodiment of the present disclosure provides a method for determining a bearer ID, including:

receiving a session update request transmitted from a target access and mobility control function (tAMF) by a session management function (SMF), and responding a session update response that carries bearer identifier (ID) allocation information to the tAMF by the SMF.

An embodiment of the present disclosure provides a device for determining a bearer identifier (ID), applied to a target access and mobility control function (tAMF), including:

a first transmitting module, which is configured to transmit a session update request to a session management function (SMF); and a first receiving module, which is configured to receive a session update response that carries bearer ID allocation information and that is responded from the SMF.

Optionally, the bearer ID allocation information is used for notifying the tAMF of: bearer IDs allocated by a source access and mobility control function (sAMF) or a mobile management entity (MME).

Optionally, the first receiving module is further configured to receive a registration request transmitted by a user equipment (UE), and a context of the UE transmitted by a first network element of a source network; and the first transmitting module is further configured to request the context of the UE from the first network element of the source network, and transmit the session update request to the SMF according to the context.

Optionally, the first network element of the source network includes: a source access and mobility control function (sAMF) or a mobile management entity (MME).

An embodiment of the present disclosure provides a device for determining a bearer identifier (ID), applied to a session management function (SMF), including:

a second receiving module, which is configured to receive a session update request transmitted by a target access and mobility control function (tAMF); and a second transmitting module, which is configured to respond a session update response that carries bearer ID allocation information to the tAMF.

Another embodiment of the present disclosure provides a storage medium. The storage medium includes stored programs which, when executed, execute the method for determining the bearer ID of any one of the embodiments described above.

With the present disclosure, the tAMF receives the session update response that carries bearer ID allocation information and that is responded by the SMF, which may solve the problem in the existing art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated and thus compatibility with the traditional network is achieved.

BRIEF DESCRIPTION OF DRAWINGS

The drawings described herein are used to provide a better understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with the embodiments. It should be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
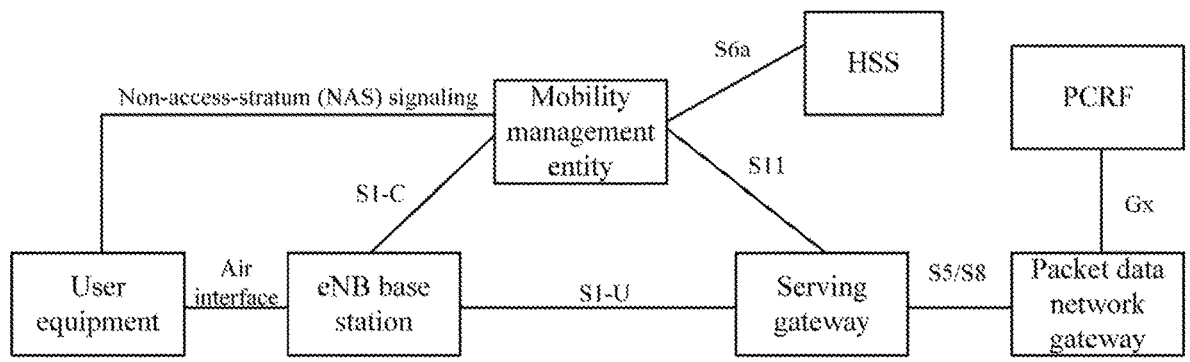
FIG. 1 is a network architecture diagram of a fourth-generation mobile communication system in a related art.
Figure 2:
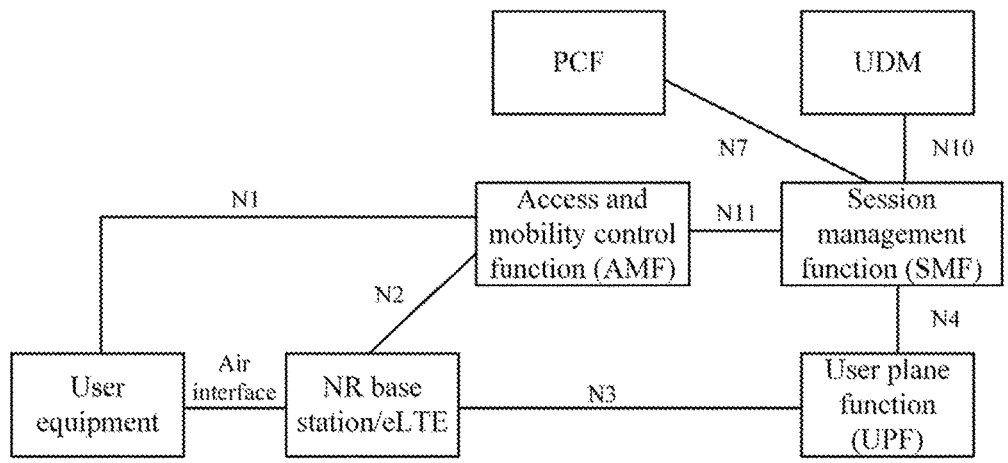
FIG. 2 is a schematic diagram of a NextGen mobile communication network architecture in the related art.
Figure 3:
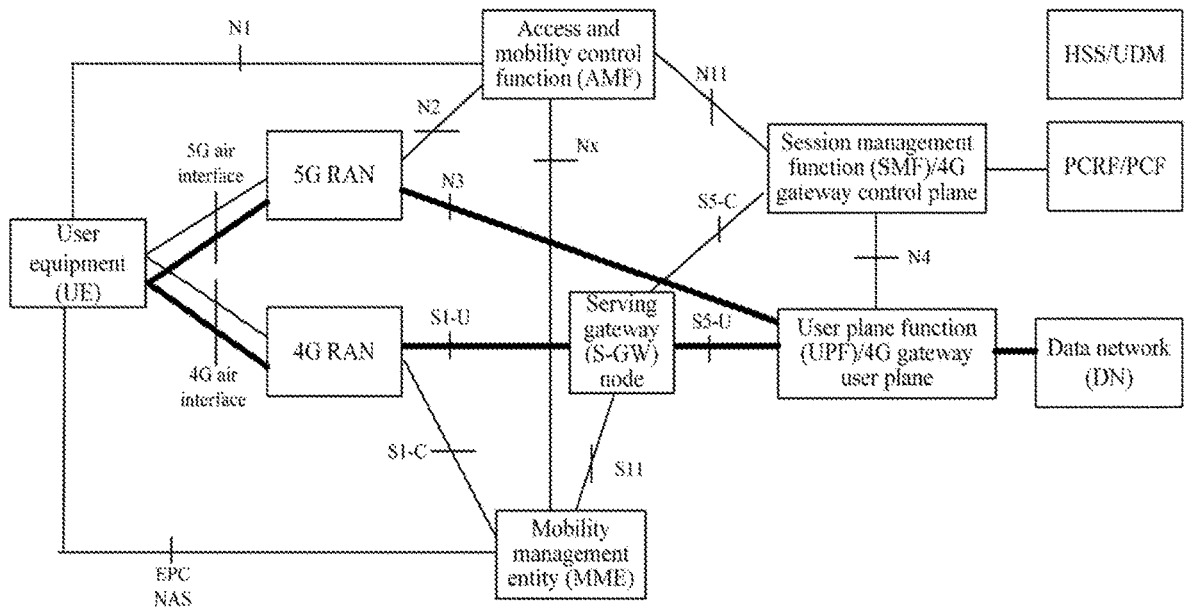
FIG. 3 is a network architecture diagram of a bidirectional handover between 4G and 5G in the related art.
Figure 4:
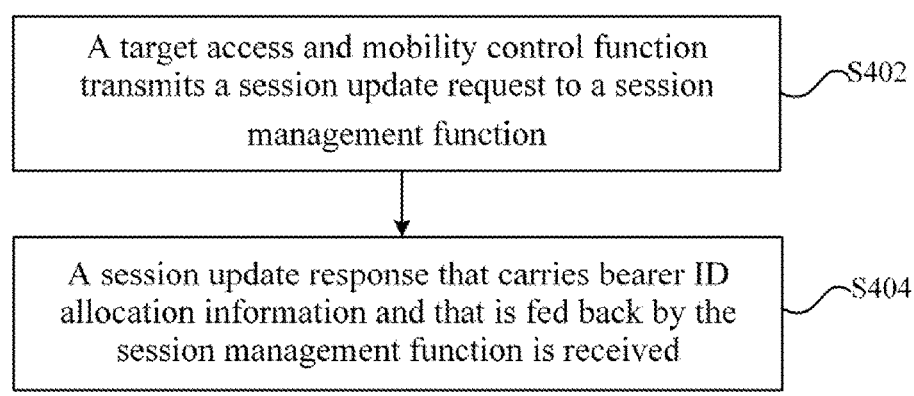
FIG. 4 is a flowchart (1) of a method for determining a bearer identifier (ID) according to an embodiment of the present disclosure.

This embodiment provides a method for determining a bearer ID. FIG. 4 is a flowchart (1) of the method for determining the bearer ID according to the embodiment of the present disclosure. As shown in FIG. 4, the process of the method includes the steps described below.

In S402, a session update request is transmitted to a SMF by a tAMF.

In S404, a session update response that carries bearer ID allocation information and that is responded by the SMF is received.

With the steps described above, the tAMF transmits the session update request to the SMF, and receives the session update response that carries the bearer ID allocation information and that is responded from the SMF. The tAMF may receive the session update response that carries the bearer ID allocation information and that is responded by the SMF, which may solve the problem in the related art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated, and thus compatibility with the traditional network is achieved.

Optionally, the bearer ID allocation information is used for notifying the tAMF of: bearer IDs allocated by a sAMF or a MME.

Optionally, the session update request carries an indication for requesting bearer ID information.

Optionally, the bearer ID allocation information includes a bearer ID list, or includes the bearer ID list and at least one of: a priority corresponding to each bearer ID, and a PDU session ID.

Optionally, the method in which the tAMF transmits the session update request to the SMF includes the steps described below.

The tAMF receives a registration request transmitted by a UE.

The tAMF requests a context of the UE from a first network element of a source network after the tAMF receives the registration request.

The tAMF receives the context of the UE transmitted by the first network element of the source network, and transmits the session update request to the SMF according to the context.

Optionally, the registration request includes: a registration request that is transmitted by the UE that has accessed to a 5G network and entered into an idle state, or a registration request that is transmitted by the UE that has accessed to a 4G network and entered into an idle state and then the UE moves to the 5G network.

Optionally, the method further includes the steps described below.

The tAMF initiates a location updating process to a UDM, and the location updating process is used for the UDM to initiate a CANCEL Location process to the sAMF.

Optionally, before the tAMF transmits the session update request to the SMF, the method further includes the steps described below.

The tAMF receives a handover preparation response message transmitted by a target base station.

Optionally, the method further includes the steps described below.

The tAMF receives a handover preparation request that is transmitted by a first network element of a source network after the first network element of the source network receives a handover request transmitted by a source base station, where the handover preparation request carries target base station information and current session information.

The tAMF transmits a PDU session handover request to the SMF according to the handover preparation request.

The tAMF receives N2 session information of the PDU session to be handed over transmitted by the SMF.

The tAMF transmits a handover preparation request to the target base station according to the session information of the PDU session to be handed over, and the handover preparation request is used for requesting a resource reservation.

The handover preparation response message carries reserved radio resource information, N2 response information, and N3 tunnel information that is allocated to a PDU session in which a resource is successfully reserved; and the session update request carries the handover preparation response message.

Optionally, the method further includes that the tAMF returns a handover response to a first network element of a source network, where the handover response is used for the first network element of the source network to transmit a handover command to a source base station and the handover command is used for a UE to hand over from the source base station to the target base station.

Optionally, before the tAMF transmits the session update request to the SMF, the method further includes that the tAMF receives a handover complete notification transmitted by a target base station.

Optionally, the first network element of the source network includes: a sAMF or a MME.

Optionally, the SMF includes: the SMF itself or a combination of the SMF and a packet data network (PDN) gateway control plane (PGW-C).

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on this understanding, the solution provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method described in each embodiment of the present disclosure.

Embodiment 2

Figure 5:
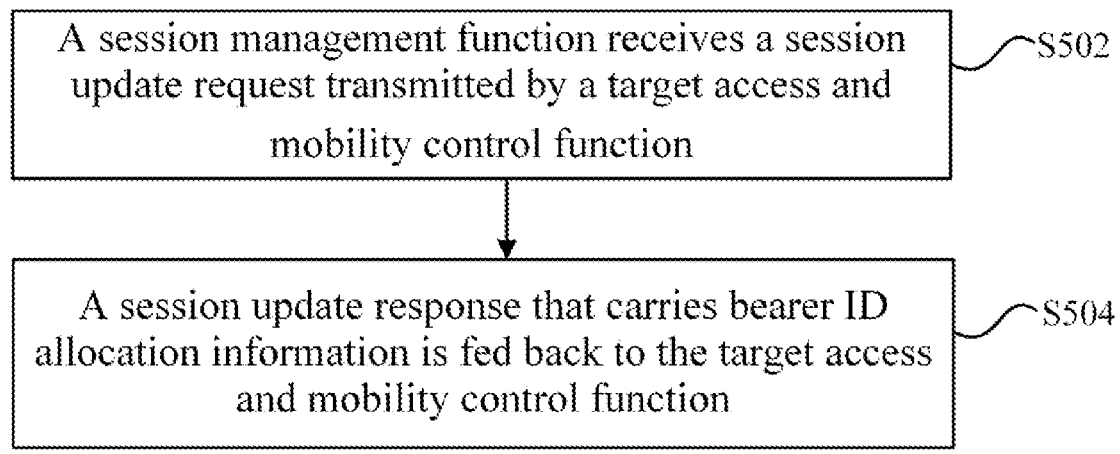
FIG. 5 is a flowchart (2) of a method for determining a bearer ID according to an embodiment of the present disclosure.

This embodiment provides a method for determining a bearer ID. FIG. 5 is a flowchart (2) of the method for determining the bearer ID according to the embodiment of the present disclosure. As shown in FIG. 5, the process of the method includes the steps described below.

In S502, a SMF receives a session update request transmitted by a tAMF.

In S504, a session update response that carries bearer ID allocation information is responded to the tAMF.

With the steps described above, the SMF receives the session update request transmitted by the tAMF, and responds the session update response that carries the bearer ID allocation information to the tAMF. The SMF responds the session update response that carries the bearer ID allocation information to the tAMF, which may solve the problem in the related art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated, and thus compatibility with the traditional network is achieved.

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on this understanding, the solution provided by the present disclosure substantially, or the part contributing to the related art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method described in each embodiment of the present disclosure.

Embodiment 3

An embodiment further provides a device for determining a bearer ID, applied to a tAMF. The device is configured to implement the embodiments and optional implementation modes described above. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 6:
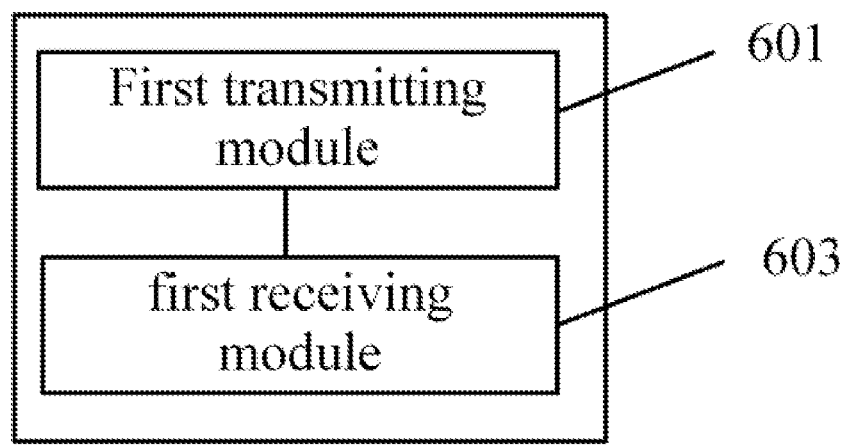
FIG. 6 is a structural block diagram (1) of a device for determining a bearer ID according to an embodiment of the present disclosure.

FIG. 6 is a structural block diagram (1) of the device for determining the bearer ID according to the embodiment of the present disclosure. As shown in FIG. 6, the device includes a first transmitting module 601 and a first receiving module 603.

The first transmitting module 601 is configured to transmit a session update request to a SMF.

The first receiving module 603 is configured to receive a session update response that carries bearer ID allocation information and that is responded by the SMF.

With the embodiment described above, the first transmitting module 601 transmits the session update request to the SMF, and the first receiving module 603 receives the session update response that carries the bearer ID allocation information and that is responded by the SMF. The first receiving module 603 may receive the session update response that carries the bearer ID allocation information and that is responded by the SMF, which may solve the problem in the related art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated and thus compatibility with the traditional network is achieved.

Optionally, the bearer ID allocation information is used for notifying the tAMF of: bearer IDs allocated by a sAMF or a MME.

Optionally, the session update request carries an indication for requesting bearer ID information.

Optionally, the bearer ID allocation information includes a bearer ID list, or includes the bearer ID list and at least one of: a priority corresponding to each bearer ID, and a PDU session ID.

Optionally, the first receiving module 603 is further configured to receive a registration request transmitted by a UE, and a context of the UE transmitted by a first network element of a source network.

The first transmitting module 601 is further configured to request the context of the UE from the first network element of the source network, and transmit the session update request to the SMF according to the context.

Optionally, the registration request includes: a registration request that is transmitted by the UE that has accessed to a 5G network and entered into an idle state, or a registration request that is transmitted by the UE that has accessed to a 4G network and entered into an idle state and then the UE moves to the 5G network.

Optionally, the first transmitting module 601 is further configured to initiate a location updating process to a UDM, and the location updating process is used for the UDM to initiate a CANCEL Location process to the sAMF.

Optionally, the first receiving module 603 is further configured to receive a handover preparation response message transmitted by a target base station.

Optionally, the first receiving module 603 is further configured to: receive a handover preparation request that is transmitted by a first network element of a source network after the first network element of the source network receives a handover request transmitted from a source base station, where the handover preparation request carries target base station information and current session information; and receive N2 session information of the PDU session to be handed over transmitted by the SMF.

The first transmitting module 601 is further configured to transmit a PDU session handover request to the SMF according to the handover preparation request; and transmit a handover preparation request to the target base station according to the session information of the PDU session to be handed over, where the handover preparation request is used for requesting a resource reservation.

The handover preparation response message carries reserved radio resource information, N2 response information, and N3 tunnel information that is allocated to a PDU session in which a resource is successfully reserved; and the session update request carries the handover preparation response message.

Optionally, the first transmitting module 601 is further configured to return a handover response to a first network element of a source network, where the handover response is used for the first network element of the source network to transmit a handover command to a source base station and the handover command is used for a UE to hand over from the source base station to the target base station.

Optionally, the first receiving module 603 is further configured to receive a handover complete notification transmitted by a target base station.

Optionally, the first network element of the source network includes: a sAMF or a MME.

Optionally, the SMF includes: the SMF itself or a combination of the SMF and a packet data network (PDN) gateway control plane (PGW-C).

It should be noted that the various modules described above may be implemented by software or hardware. Implementation by hardware may, but may not necessarily, be performed in the following manner: The various modules described above are located in a same processor or their respective processors in any combination.

Embodiment 4

An embodiment further provides a device for determining a bearer ID, applied to a SMF. The device is configured to implement the embodiments and optional implementation modes described above. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 7:
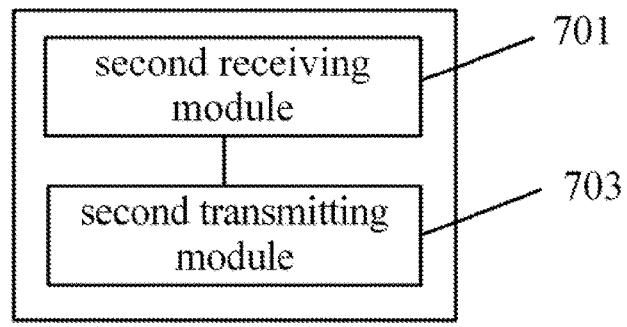
FIG. 7 is a structural block diagram (2) of a device for determining a bearer ID according to an embodiment of the present disclosure.

FIG. 7 is a structural block diagram (2) of the device for determining the bearer ID according to the embodiment of the present disclosure. As shown in FIG. 7, the device includes a second receiving module 701 and a second transmitting module 703.

The second receiving module 701 is configured to receive a session update request transmitted by a tAMF.

The second transmitting module 703 is configured to respond a session update response that carries bearer ID allocation information to the tAMF.

With the embodiments described above, the second receiving module 701 receives the session update request transmitted by the tAMF, and the second transmitting module 703 responds the session update response that carries the bearer ID allocation information to the tAMF. The second transmitting module 703 can respond the session update response that carries the bearer ID allocation information to the tAMF, which may solve the problem in the related art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated and thus compatibility with the traditional network is achieved.

It should be noted that the various modules described above may be implemented by software or hardware. Implementation by hardware may, but may not necessarily, be performed in the following manner: The various modules described above are located in a same processor or their respective processors in any combination.

The method for determining the bearer ID described above will be illustrated below in conjunction with the examples 1 to 5, which is not intended to limit the scope of the embodiments of the present disclosure.

EXAMPLE 1

When the idle state mobility/handover within 5G or the idle state mobility/handover from 4G to 5G occurs, a SMF returns EBI allocation information to an AMF in a response to a session update request.

The AMF may request the EBI information in a session update request.

When the idle state mobility within 5G occurs, a PDU session which 4G session information has been allocated is set to be active by a UE.

When the idle state mobility from 4G to 5G occurs, a PDU session corresponding to a PDN connection which 5G session information has been allocated is set to be active by the UE.

EXAMPLE 2

Figure 8:
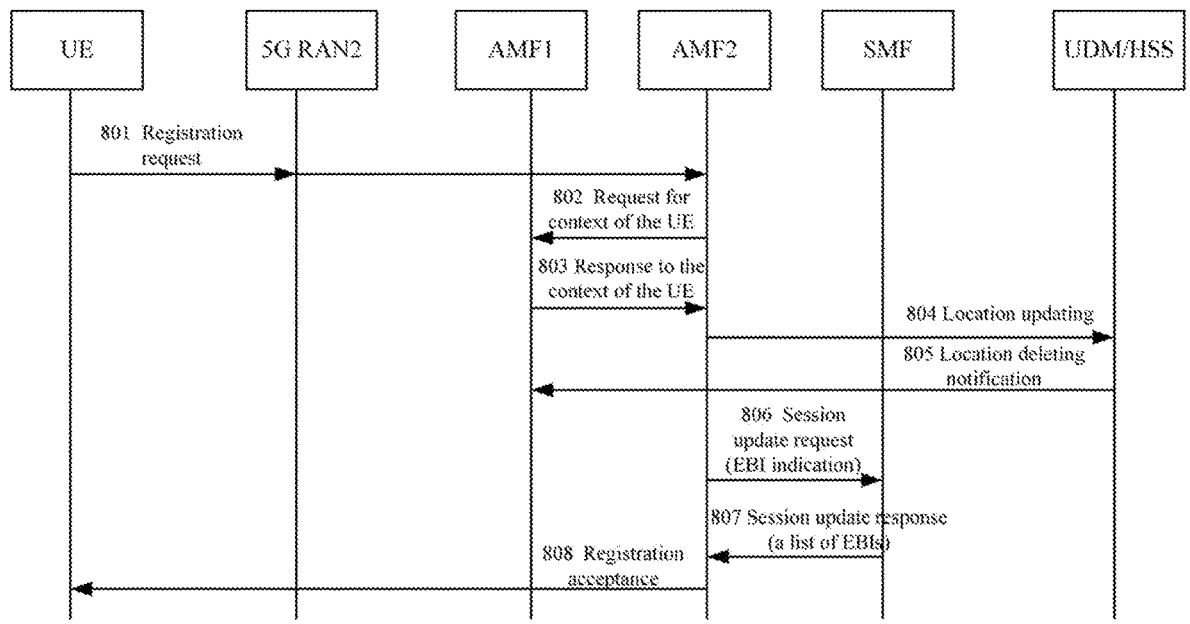
FIG. 8 is a flowchart (1) of a method for determining a bearer ID according to a preferred embodiment of the present disclosure.

FIG. 8 is a flowchart (1) of a method for determining a bearer ID according to a preferred embodiment of the present disclosure. The application scenario is inter-AMF idle state mobility, where a UE is accessed to the 5G system, and the AMF serving for the UE is an AMF1, that is, a source AMF (sAMF). The UE enters an idle state, and moves out of the tracking area of the sAMF.

The steps are described below.

In S801, the UE transmits a registration request, and then the request is received and transmitted by a 5G base station to an AMF 2, that is, a target AMF (tAMF). Optionally, a PDU session to which parameters corresponding to 4G are allocated is set to be active by the UE in the registration request.

In S802, the tAMF requests a context of the UE from the sAMF.

In S803, the sAMF returns the context of the UE to the tAMF.

In S804, the tAMF initiates a location updating process to a UDM.

In S805, the UDM initiates a CANCEL Location process to the sAMF.

In S806, the tAMF initiates a session update request to the SMF according to the context of the UE, and optionally, an indication for requesting EBI information is carried.

In S807, the SMF returns a session update response to the tAMF, where the EBI allocation information is carried; and the EBI allocation information includes a list of EBIs, and may also include priority information corresponding to each EBI, the PDU session ID, and other information.

Optionally, when the UE has multiple PDU sessions, steps S806 and S807 need to be performed for each PDU session.

In S808, the tAMF returns a registration acceptance message to the UE.

EXAMPLE 3

Figure 9:
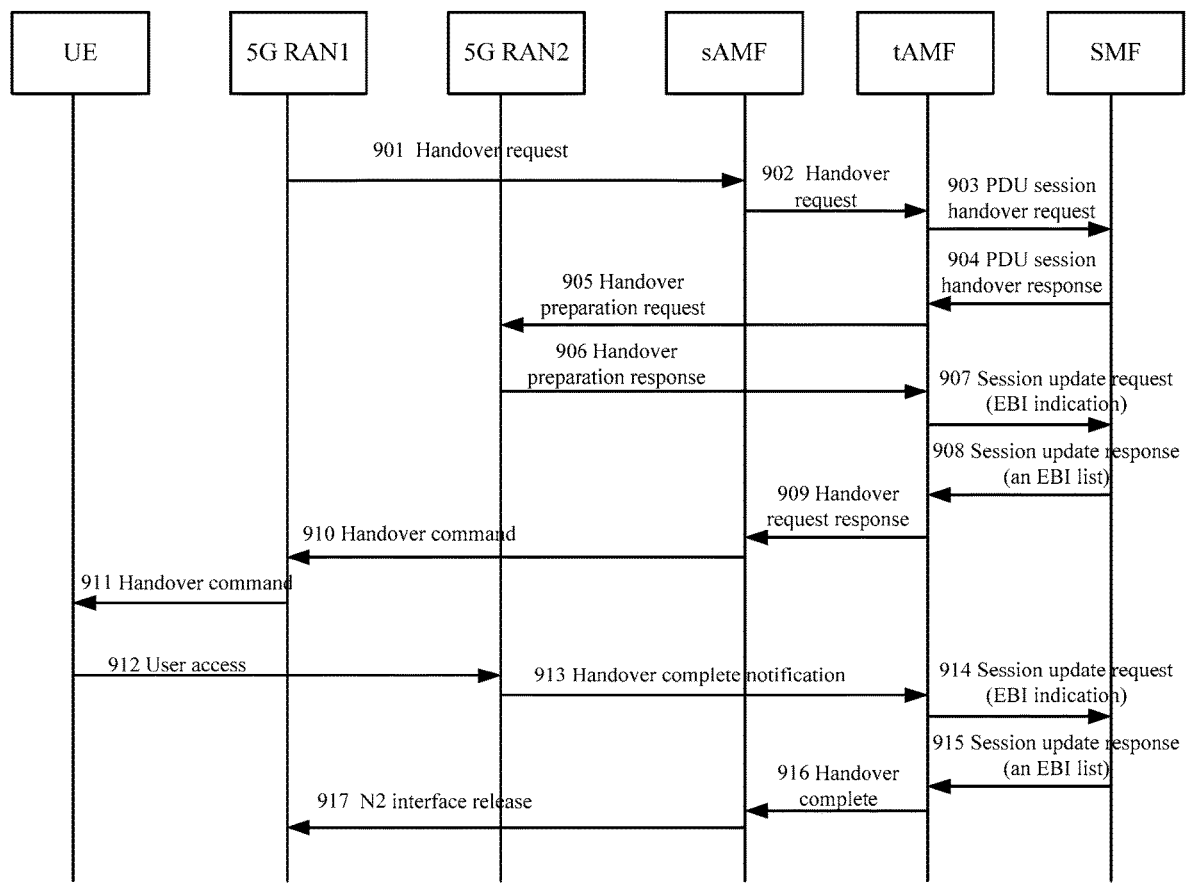
FIG. 9 is a flowchart (2) of a method for determining a bearer ID according to a preferred embodiment of the present disclosure.

FIG. 9 is a flowchart (2) of a method for determining a bearer ID according to a preferred embodiment of the present disclosure. The application scenario is an inter-AMF handover within 5G, where a UE is accessed to the 5G system, the AMF serving for the UE is a source AMF (sAMF), and the UE is in a connected state. When the UE is moving, a 5G serving base station 5G RAN1 (i.e., the source base station in the above embodiment) finds that the UE moves out of the signal coverage range.

The steps are described below.

In S901, a 5G base station 5G RAN1 finds that the UE is to move out of the coverage range (for example, the RAN1 finds that the signal of the UE is lower than the handover threshold according to the measurement report of the UE), and the 5G RAN1 decides to handover the UE to the target base station 5G RAN2. The 5G base station 5G RAN1 initiates a handover request to the sAMF, where the message carries target base station information and current session information, and the session information includes PDU session information.

In S902, the sAMF selects a target AMF (tAMF) according to the target base station information, and then initiates a handover preparation request to the tAMF, where the message carries the target base station information and the current session information, and the current session information includes the SMF address and the PDU session information.

In S903, the tAMF transmits a PDU session handover request to the SMF according to the SMF information.

In S904, the SMF returns N2 session information of the PDU session to be handed over, where information such as QoS is included.

Optionally, when multiple PDU sessions in the UE need to be handed over, steps S903 and S904 are performed for the tAMF based on each PDU session to be handed over.

In S905, after receiving the SMF responses of all PDU sessions to be handed over, the tAMF requests a resource reservation from the target base station 5G RAN2 according to the session information.

In S906, the 5G base station 5G RAN2 reserves radio resources and returns a handover response message according to the PDU session information, and the handover response message carries reserved radio resource information, N2 response information and N3 tunnel information that is allocated by the target base station to a PDU session in which a resource is successfully reserved.

In S907, the tAMF transmits a session update request message to the SMF, and the session update request message carries an N2 handover preparation response and N3 tunnel information. Optionally, an indication for requesting an EBI is carried in the he session update request message.

In S908, the SMF returns a response to the session update request to the tAMF. The EBI allocation information of the SMF is carried in the response to the session update request.

Optionally, when multiple PDU sessions in the UE need to be handed over, steps S907 and S908 are performed for the tAMF based on each PDU session to be handed over.

In S909, after receiving all the SMF responses, the tAMF returns a handover request response to the sAMF, where the message carries radio resource information reserved by the target base station for the PDU session.

In S910, after determining that a resource successfully reserved for the PDU session exists, the sAMF transmits a handover command to the 5G base station 5G RAN1, the radio resource information reserved by the target base station for the PDU session is carried in the handover command.

In S911, the base station 5G RAN1 initiates a handover command to the UE, and the radio resource information reserved by the target base station is carried in the handover command.

In S912, the UE is accessed to the base station 5G RAN2 according to the radio resource information reserved by the target base station.

In S913, the base station 5G RAN2 initiates a handover notification message to the tAMF.

In S914, the tAMF transmits a session update request message to the SMF, a handover complete notification is carried in the session update request message. Optionally, an indication for requesting an EBI is carried in the session update request message.

In S915, the SMF returns a session update response to the tAMF to confirm that the handover is completed. The EBI allocation information of the SMF is carried the session update response.

Optionally, when multiple PDU sessions in the UE need to be handed over, steps S914 to S917 are performed for the tAMF based on each PDU session to be handed over.

In S916, the tAMF returns a handover complete message to the sAMF.

In S917, the sAMF transmits an N2 connection release request to the source base station 1.

Two optional implementation modes are provided in the above steps, that is, the tAMF may request the EBI information in step S907, or may request the EBI information in step S914. Optionally, the tAMF may explicitly indicate that the EBI information is required in the request or may not provide this indication. The EBI allocation information includes an EBI list, and may also include priority information corresponding to each EBI, the PDU session ID, and other information.

EXAMPLE 4

Figure 10:
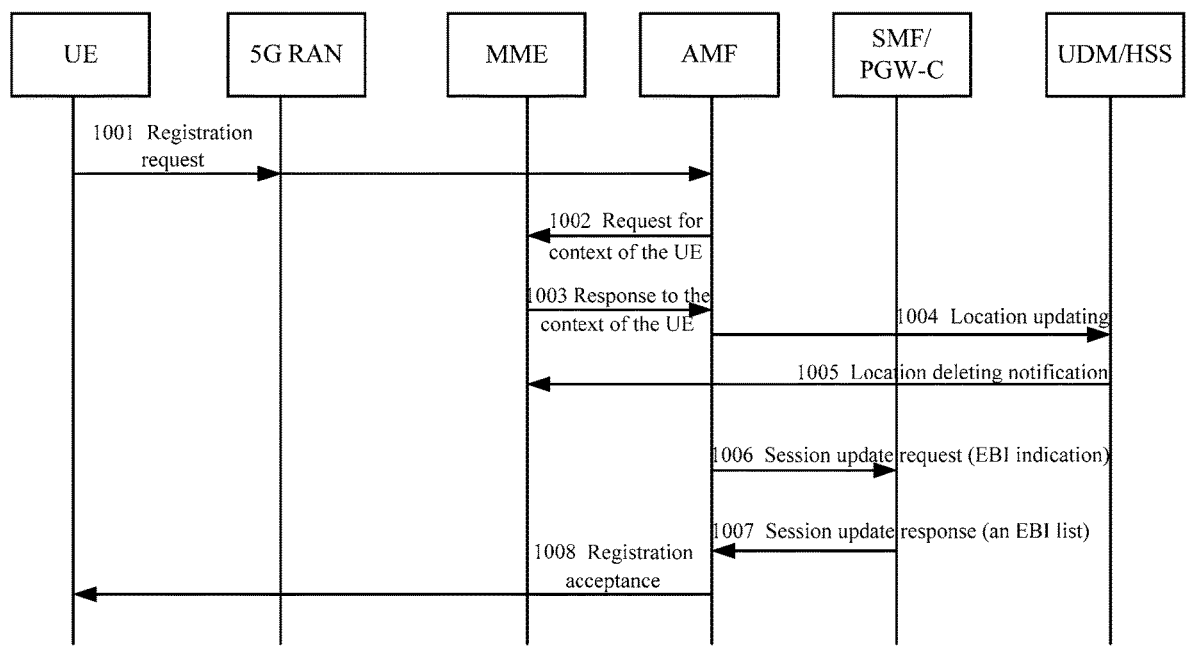
FIG. 10 is a flowchart (3) of a method for determining a bearer ID according to a preferred embodiment of the present disclosure.

FIG. 10 is a flowchart (3) of a method for determining a bearer ID according to a preferred embodiment of the present disclosure. The application scenario is idle state mobility from 4G to 5G, where a UE is accessed to the 4G system, a PDN connection and a bearer have been established, and 5G PDU session information corresponding to the PDN connection and the bearer has been interacted between the UE and the network. The UE enters into an idle state, and is connected to the 5G system during the UE is moving.

The steps are described below.

In S1001, the UE transmits a registration request, after the request is received by a 5G base station, the request is transmitted to an AMF by the 5G base station. Optionally, the UE sets PDU sessions to be active (Notes: there may be multiple PDU sessions) in the registration request.

In S1002, the AMF requests a context of the UE from a MME.

In S1003, the MME returns the context of the UE to the AMF.

In S1004, the AMF initiates a location updating process to a UDM/HSS.

In S1005, the UDM/HSS initiates a CANCEL Location process to the MME.

In S1006, the AMF initiates a session update request to the SMF according to the context of the UE, and optionally, an indication for requesting EBI information is carried.

In S1007, the SMF returns a session update response to the AMF, and the EBI allocation information is carried in the session update response; and the EBI allocation information includes an EBI list, and may also include priority information corresponding to each EBI, the PDU session ID, and other information.

Optionally, when the UE has multiple PDU sessions, steps S1006 and S1007 need to be performed for each PDU session.

In S1008, the AMF returns a registration acceptance message to the UE.

EXAMPLE 5

Figure 11:
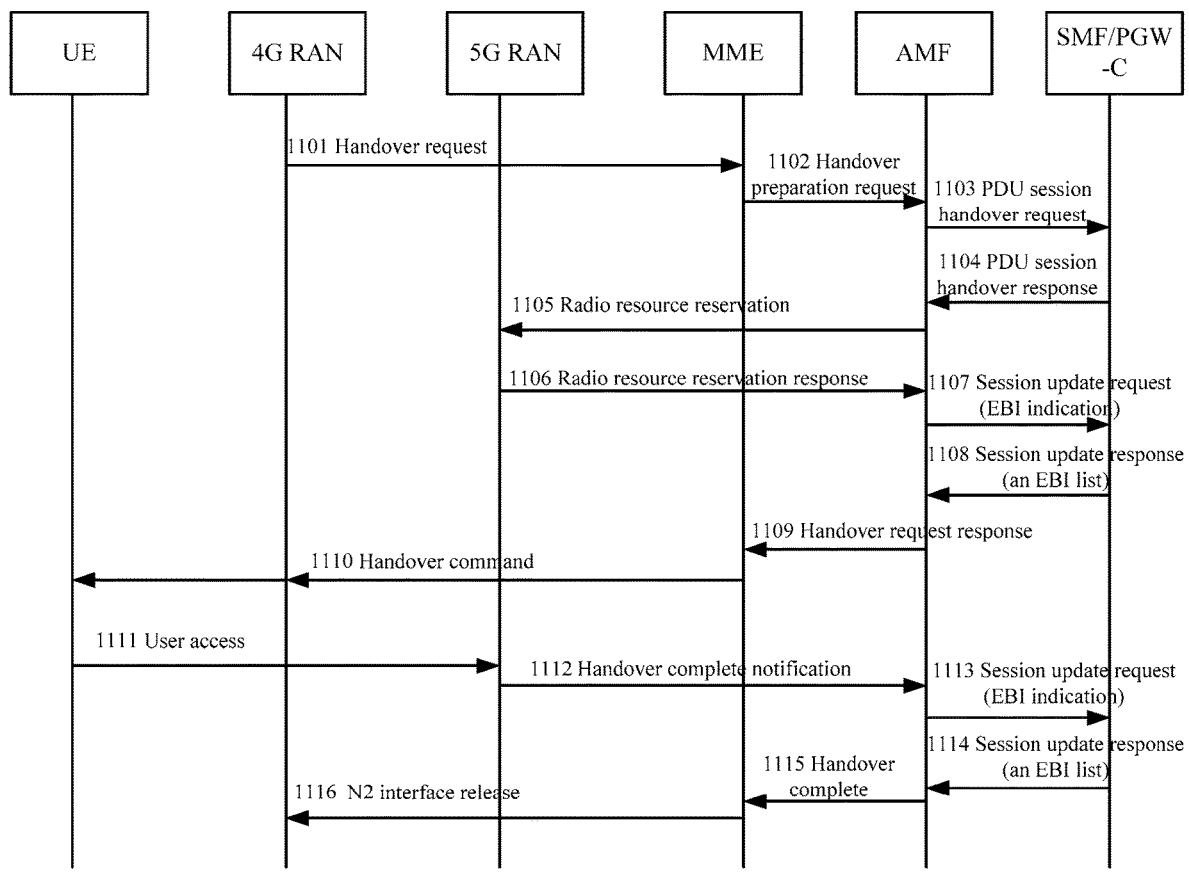
FIG. 11 is a flowchart (4) of a method for determining a bearer ID according to a preferred embodiment of the present disclosure.

FIG. 11 is a flowchart (4) of a method for determining a bearer ID according to a preferred embodiment of the present disclosure. The application scenario is 4G to 5G handover, where a UE is accessed to the 4G system, a PDN connection and a bearer have been established, and 5G PDU session information corresponding to the PDN connection and the bearer has been interacted between the UE and the network. When the UE is moving in a connected state, a 4G base station 4G RAN currently serving the UE finds that the UE moves out of the signal coverage range.

The steps are described below.

In S1101, the 4G base station 4G RAN decides to handover the UE to a target 5G base station 5G RAN (propose using "NG-RAN") (for example, when the 4G RAN finds that the UE is to move out of the coverage range according to the measurement report of the UE). The 4G base station 4G RAN initiates a handover request to a MME, where the message carries target base station information.

In S1102, the MME selects a target AMF according to the target base station information, and then initiates a Forward Relocation request to the AMF, where the message carries the target base station information and current 4G session information.

In S1103, the AMF transmits a PDU session handover request to a SMF according to the session information, session information corresponding to 4G is carried in the PDU session handover request.

In S1104, the SMF returns N2 session information of the PDU session to be handed over, information such as QoS is included in the N2 session information.

Optionally, when multiple PDU sessions in the UE need to be handed over, steps S1103 and S1104 are performed for the AMF based on each PDU session to be handed over.

In S1105, after receiving the SMF responses of all PDU sessions to be handed over, the AMF requests a resource reservation from the target base station 5G RAN according to the session information.

In S1106, the base station 5G RAN reserves radio resources according to the PDU session information, and returns a handover request response message which carries reserved radio resource information, N2 response information and N3 tunnel information that is allocated by the target base station to a PDU session in which a resource is successfully reserved.

In S1107, the AMF transmits a session update request message to the SMF, and an N2 handover preparation response and N3 tunnel information are carried in the session update request message. Optionally, an indication for requesting an EBI is carried in the session update request message.

In S1108, the SMF returns a response to the session update request to the AMF. EBI allocation information in the SMF and 4G session information that is required for a Forward Relocation response are carried.

Optionally, when multiple PDU sessions in the UE need to be handed over, steps S1107 and S1108 are performed for the AMF based on each PDU session to be handed over.

In S1109, after receiving all the SMF responses, the AMF returns a Forward Relocation response to the MME, where the message carries the radio resource information reserved by the target base station for all the PDU sessions, and the 4G session information from all SMFs for handover.

In S1110, after determining that a resource successfully reserved for the PDN session exists, the MME transmits a handover command to the 4G base station 4G RAN, where the radio resource information reserved by the target base station is carried. The 4G RAN initiates a handover command to the UE, where the radio resource information reserved by the target base station is carried.

In S111, the UE is accessed to the base station 5G RAN according to the radio resource information reserved by the target base station.

In S1112, the base station 5G RAN initiates a handover notification message to the AMF.

In S1113, the AMF transmits a session update request message to the SMF, where a handover complete notification is carried. Optionally, an indication for requesting an EBI is carried.

In S1114, the SMF returns a session update response to the AMF to confirm that the handover is completed. The EBI allocation information in the SMF is carried in the session update response.

Optionally, when multiple PDU sessions in the UE need to be handed over, steps S1113 to S1114 are performed for the AMF based on each PDU session to be handed over.

In S1115, the AMF returns a handover complete message to the MME.

In S1116, the MME transmits an S1 connection release request to the source base station 1.

Two optional implementation modes are provided in the above steps, that is, the AMF may request the EBI information in step S1107, or may request the EBI information in step S1113. Optionally, the AMF may explicitly indicate that the EBI information is required in the request or may not provide this indication. The EBI allocation information includes an EBI list, and may also include priority information corresponding to each EBI, the PDU session ID, and other information.

In the 5G network, service-oriented has been achieved for the interaction of the control planes. In the above embodiments, the service operation Nsmf_PDUSession_UpdateSMContext is invoked in steps S806 to S807 (session update request, session update response), steps S1006 to S1007 (session update request, session update response), steps S903 to S904, S907 to S908, S914 to S915, and steps S1103 to S1104, S1107 to S1108, S1113 to S1114, where the requested parameter is an input of the service call, and the returned response is an output of the service call.

In the various embodiments described above, in the step of transmitting a session update request to the SMF by the AMF (or tAMF) (such as steps S806 to S807 and S1006 to S1007), the AMF (or tAMF) may also transmit an operation Nsmf_PDUSession_CreateSMContext, where the requested parameter is the input of the service call, and the returned response is the output of the service call.

This present disclosure may still use the service call described above, or may generate a new service call. In the implementation modes described above, the requested parameter is the input of the service call, and the returned response is the output of the service call.

Embodiment 5

An embodiment of the present disclosure further provides a storage medium. Optionally, in this embodiment, the storage medium described above may be configured to store program codes for executing the steps described below.

In S1, a session update request is transmitted to a SMF.

In S2, a session update response that carries bearer ID allocation information and that is responded by the SMF is received.

Optionally, the bearer ID allocation information is used for notifying a tAMF of: bearer IDs allocated by a sAMF or a MME.

Optionally, the session update request carries an indication for requesting bearer ID information.

Optionally, the bearer ID allocation information includes a bearer ID list, or includes the bearer ID list and at least one of: a priority corresponding to each bearer ID, and a PDU session ID.

Optionally, the storage medium is further configured to store program codes for executing the steps described below.

A registration request transmitted by a UE is received.

A context of the UE is requested from a first network element of a source network after the registration request is received.

The context of the UE transmitted by the first network element of the source network is received, and the session update request is transmitted to the SMF according to the context.

Optionally, the registration request includes: a registration request that is transmitted by the UE that has accessed to a 5G network and entered into an idle state, or a registration request that is transmitted by the UE that has accessed to a 4G network and entered into an idle state after the UE moves to the 5G network.

Optionally, the first network element of the source network includes: a sAMF or a MME.

Optionally, the storage medium is further configured to store program codes for executing the following step: A location updating process is initiated to a UDM, where the location updating process is used for the UDM to initiate a CANCEL location process to the sAMF.

Optionally, the storage medium is further configured to store program codes for executing the steps described below.

A handover preparation request that is transmitted by a first network element of a source network after the first network element of the source network receives a handover request transmitted by a source base station is received, where the handover preparation request carries target base station information and current session information.

A PDU session handover request is transmitted to the SMF according to the handover preparation request.

N2 session information of the PDU session to be handed over and transmitted by the SMF is received.

Optionally, the storage medium is further configured to store program codes for executing the following step: A handover preparation request is transmitted to the target base station according to the session information of the PDU session to be handed over, where the handover preparation request is used for requesting a resource reservation.

A handover preparation response message transmitted by the target base station is received, where the handover preparation response message carries reserved radio resource information, N2 response information, and N3 tunnel information that is allocated to a PDU session in which a resource is successfully reserved; and the session update request carries the handover preparation response message.

Optionally, the storage medium is further configured to store program codes for executing the following step: A handover response is returned to the first network element of the source network.

Optionally, the first network element of the source network includes a sAMF, and the handover response is used for the sAMF to transmit a handover command to a source base station. The handover response carries radio resource information reserved by the base station for the PDU session and the handover command is used for a UE to hand over from the source base station to the target base station.

Optionally, the first network element of the source network includes a MME, and the handover response is used for the MME to transmit a handover command to a source base station, where the handover command is used for a UE to hand over from the source base station to the target base station.

Optionally, the storage medium is further configured to store program codes for executing the following step: A handover complete notification transmitted by the target base station is received.

Optionally, the SMF includes: the SMF itself or a combination of the SMF and a packet data network (PDN) gateway control plane (PGW-C).

Optionally, in this embodiment, the storage medium described above may include, but is not limited to, a U disk, a read-only memory (ROM), a random access memory (RAM), a mobile hard disk, a magnetic disk, an optical disk or another medium capable of storing program codes.

Optionally, for specific examples in this embodiment, reference may be made to the examples described in the above embodiments and optional implementation modes, and repetition will not be made in this embodiment.

Apparently, it should be understood by those skilled in the art that each of the above-mentioned modules or steps of the present disclosure may be implemented by a general-purpose computing device, the modules or steps may be concentrated on a single computing device or distributed on a network formed by multiple computing devices, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the illustrated or described steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

The present disclosure applies to the field of NextGen radio communications (5G), to solve the problem in the existing art, yet to be solved effectively, of how to determine allocated EBI information after mobility events such as idle state mobility within 5G, idle state mobility from 4G to 5G and a connected state handover from 4G to 5G occur. In addition, no special requirement is needed for the MME, so the traditional network is not needed to be updated and thus compatibility with the traditional network is achieved.

What is claimed is:

1. A method for wireless communication, comprising:
transmitting, by a target access and mobility control function for a handover of a mobile device from an evolved packet system (EPS) to a fifth-generation (5G) system, a session request to a session management function, and
receiving, by the target access and mobility control function, a session response from the session management function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

2. The method of claim 1, wherein the information indicates that each of the bearer identifiers is allocated by the mobile management entity.

3. The method of claim 1, wherein the session request comprises a create session request and the session response comprise a create session response.

4. The method of claim 1, wherein the session request comprises an update session request and the session response comprise an update session response.

5. A method for wireless communication, comprising:
receiving, by a session management function for a handover of a mobile device from an evolved packet system (EPS) to a fifth-generation (5G) system, a session request from a target access and mobility control function, and
transmitting, by the session management function, a session response to the target access and mobility control function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

6. The method of claim 5, wherein the information indicates that each of the bearer identifiers is allocated by the mobile management entity.

7. The method of claim 5, wherein the session request comprises a create session request and the session response comprise a create session response.

8. The method of claim 5, wherein the session request comprises an update session request and the session response comprise an update session response.

9. A device for wireless communication, comprising:
a processor, and
a memory including processor executable code, wherein the processor executable code upon execution by the processor configures the processor to:
transmit a session request to a session management function for a handover of a mobile device from an evolved packet system (EPS) to a fifth-generation (5G) system; and
receive a session response from the session management function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

10. The device of claim 9, wherein the information indicates that each of the bearer identifiers is allocated by the mobile management entity.

11. The device of claim 9, wherein the session request comprises a create session request and the session response comprise a create session response.

12. The device of claim 9, wherein the session request comprises an update session request and the session response comprise an update session response.

13. A device for wireless communication, comprising:
a processor, and
a memory including processor executable code, wherein the processor executable code upon execution by the processor configures the processor to:
receive a session request from a target access and mobility control function for a handover of a mobile device from an evolved packet system (EPS) to a fifth-generation (5G) system; and
transmit a session response to the target access and mobility control function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

14. The device of claim 13, wherein the information indicates that each of the bearer identifiers is allocated by the mobile management entity.

15. The device of claim 13, wherein the session request comprises a create session request and the session response comprise a create session response.

16. The device of claim 13, wherein the session request comprises an update session request and the session response comprise an update session response.

17. A non-transitory storage medium, comprising stored programs, wherein, when executed, the programs execute a method for wireless communication that comprises:
transmitting, by a target access and mobility control function for a handover of a mobile device from an evolved packet system (EPS) to a fifth-generation (5G) system, a session request to a session management function, and receiving, by the target access and mobility control function, a session response from the session management function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

18. The non-transitory storage medium of claim 17, wherein the information indicates that each of the bearer identifiers is allocated by the mobile management entity.

19. The non-transitory storage medium of claim 17, wherein the session request comprises a create session request and the session response comprise a create session response.

20. The non-transitory storage medium of claim 17, wherein the session request comprises an update session request and the session response comprise an update session response.

21. A non-transitory storage medium, comprising stored programs, wherein, when executed, the programs execute a method for wireless communication that comprises:

receiving, by a session management function for a handover of a mobile device from an evolved packet system (EPS) to a fifth-generation (5G) system, a session request from a target access and mobility control function, and transmitting, by the session management function, a session response to the target access and mobility control function, wherein the session response includes a packet data unit session identifier and a list of allocated bearer identifiers, each bearer identifier in the list corresponding to a priority, and wherein the session response further comprises information indicating whether a bearer corresponding to a bearer identifier is allocated by a mobile management entity.

22. The non-transitory storage medium of claim 21, wherein the information indicates that each of the bearer identifiers is allocated by the mobile management entity.

23. The non-transitory storage medium of claim 21, wherein the session request comprises a create session request and the session response comprise a create session response.

24. The non-transitory storage medium of claim 21, wherein the session request comprises an update session request and the session response comprise an update session response.

* * * * *